US009522480B2

(12) United States Patent
Neubauer et al.

(10) Patent No.: US 9,522,480 B2
(45) Date of Patent: Dec. 20, 2016

(54) CONTINUOUS METHOD FOR PRODUCING A LIGHTWEIGHT SANDWICH PANEL AND LIGHTWEIGHT SANDWICH PANELS PRODUCIBLE ACCORDING TO THIS METHOD

(71) Applicants: Gerald Neubauer, Hamburg (DE); Lutz Helmrich, Wentorf bei Hamburg (DE)

(72) Inventors: Gerald Neubauer, Hamburg (DE); Lutz Helmrich, Wentorf bei Hamburg (DE)

(73) Assignees: Gerald Neubauer, Hamburg (DE); Lutz Helmrich, Wentorf Bei Hamburg (DE); Albrecht Epple, Hamm (DE); Hugo Scheiner, Marktheidenfeld (DE)

( * ) Notice: Subject to any disclaimer, the term of this patent is extended or adjusted under 35 U.S.C. 154(b) by 0 days.

(21) Appl. No.: 14/435,597

(22) PCT Filed: Oct. 14, 2013

(86) PCT No.: PCT/DE2013/000598
§ 371 (c)(1),
(2) Date: Apr. 14, 2015

(87) PCT Pub. No.: WO2014/063672
PCT Pub. Date: May 1, 2014

(65) Prior Publication Data
US 2015/0239146 A1 Aug. 27, 2015

(30) Foreign Application Priority Data

Oct. 15, 2012 (DE) ........................ 10 2012 020 145

(51) Int. Cl.
| | |
|---|---|
| *B29C 44/32* | (2006.01) |
| *B32B 5/20* | (2006.01) |
| *B27N 3/02* | (2006.01) |
| *B27N 3/14* | (2006.01) |
| *B29C 44/30* | (2006.01) |
| *B29C 44/24* | (2006.01) |
| *B27N 3/00* | (2006.01) |
| *E04C 2/24* | (2006.01) |
| *B32B 21/02* | (2006.01) |
| *B32B 21/04* | (2006.01) |
| *B27N 3/18* | (2006.01) |
| *B27N 7/00* | (2006.01) |

(Continued)

(52) U.S. Cl.
CPC . *B27N 3/02* (2013.01); *B27N 3/00* (2013.01); *B27N 3/002* (2013.01); *B27N 3/005* (2013.01); *B27N 3/14* (2013.01); *B27N 3/18* (2013.01); *B27N 7/005* (2013.01); *B29C 44/24* (2013.01); *B29C 44/30* (2013.01); *B29C 44/326* (2013.01); *B32B 5/20* (2013.01); *B32B 21/02* (2013.01); *B32B 21/047* (2013.01); *E04C 2/243* (2013.01); *B32B 37/1027* (2013.01); *B32B 2038/0084* (2013.01); *B32B 2250/40* (2013.01); *B32B 2266/0278* (2013.01); *B32B 2305/022* (2013.01); *B32B 2307/718* (2013.01); *B32B 2307/72* (2013.01); *B32B 2310/049* (2013.01); *B32B 2317/16* (2013.01); *B32B 2607/00* (2013.01); *Y10T 428/24355* (2015.01)

(58) Field of Classification Search
CPC ........ B29C 44/24; B29C 44/30; B29C 44/326; B32B 5/20; B32B 21/02; B32B 21/047; B32B 37/1027; B32B 2038/0084; B32B 2250/40; B32B 2266/0278; B32B 2305/022; B32B 2317/16; B27N 3/002; B27N 3/005; B27N 3/02; B27N 3/14; B27N 3/18; E04C 2/243; E04C 2/246
See application file for complete search history.

(56) References Cited

U.S. PATENT DOCUMENTS

| | | | |
|---|---|---|---|
| 2005/0202253 A1* | 9/2005 | Grafenauer | ............ B27N 1/006 428/423.1 |
| 2005/0257893 A1 | 11/2005 | Rub et al. | |

(Continued)

FOREIGN PATENT DOCUMENTS

| | | |
|---|---|---|
| AT | 006375 U1 | 9/2002 |
| CA | 2693186 A1 | 8/2011 |

(Continued)

OTHER PUBLICATIONS

English Translation of Abstract of DD 252572 A1 dated Dec. 23, 1987 (cited in IDS filed Apr. 14, 2015).

(Continued)

Primary Examiner — Michael Tolin
(74) Attorney, Agent, or Firm — Porter Wright Morris & Arthur LLP

(57) ABSTRACT

A continuous method for producing a lightweight sandwich panel comprises providing a scattered layer of glue-coated woodchips; pressing this layer and bonding the wood chips under pressure and temperature conditions such that a high vapor pressure is built up in the center between the cover layers; relieving the pressure by moving the pressing surfaces away from one another, whereby the chipboard tears open in the center due to the built-up vapor pressure and divides into two cover layers of equal thickness; moving the cover layers apart; introducing a foam system that can be foamed and cured to form a hard foam between the cover layers; bringing the cover layers together to the nominal thickness of the lightweight sandwich panel to be produced and holding the pressure until the intermediate layer has finished reacting; and finishing the lightweight sandwich panel.

13 Claims, No Drawings

(51) Int. Cl.
    *B32B 37/10*     (2006.01)
    *B32B 38/00*     (2006.01)

(56) References Cited

U.S. PATENT DOCUMENTS

| | | |
|---|---|---|
| 2010/0098933 A1 | 4/2010 | Ludtke et al. |
| 2010/0133713 A1 | 6/2010 | Grafenauer |

FOREIGN PATENT DOCUMENTS

| | | |
|---|---|---|
| DE | 1228403 A | 11/1966 |
| DE | 252572 A1 | 12/1987 |
| DE | 102004022677 A1 | 11/2005 |
| DE | 102005061922 A1 | 7/2007 |
| DE | 202006018792 U1 | 4/2008 |
| EP | 1561554 A1 | 8/2005 |
| EP | 1469140 B1 | 3/2009 |
| JP | 57-185136 A | 11/1982 |
| JP | 2002-338373 A * | 11/2002 |
| WO | 2005/009702 A1 | 2/2005 |
| WO | 2008/071618 A2 | 6/2008 |
| WO | 2010/119431 A2 | 10/2010 |
| WO | 2010/133610 A1 | 11/2010 |

OTHER PUBLICATIONS

English Translation of Claims of DE 1 228 403 A dated Nov. 10, 1966 (cited in IDS filed Apr. 14, 2015).
Randall et al, "The polyurethanes book", Wiley 2002, (pp. 262-265).
Kapps, Buschkamp: "Herstellung von Polyurethan (PUR)-Hartschaumstoff", 2000 (pp. 49-55), with English translation.
Dunky et al, "Holzwerkstoffe und Leime—Technologie und Einflussfaktoren", Springer-Verlag Berlin Heidelberg 2002 (pp. 790-802 and pp. 836-850), with English translation.

* cited by examiner

CONTINUOUS METHOD FOR PRODUCING A LIGHTWEIGHT SANDWICH PANEL AND LIGHTWEIGHT SANDWICH PANELS PRODUCIBLE ACCORDING TO THIS METHOD

The literature in the field to which the invention relates is characterised by "flexible" or, expressed less euphemistically, chaotic terminology, in which not only does the designation of certain objects, processes, states and properties vary from one publication to another, and the same name may also be used for different concepts, but even within the same publication consistent terminology is the exception to the rule.

In order to satisfy the requirements with regard to conciseness and clarity to which the description and claims are subject, the description itself is therefore preceded by a list of the technical terms and acronyms thereof used in the description and claims, each accompanied by a definition of what they connote and, where necessary, the reference sign assigned thereto.

1) Wood Composite Panel:

Collective term for panels consisting of layers that include or consist of solid wood, plywood, woodchip and/or fibre material.

2) Solid Wood Panel:

Wood panels consisting of a wooden board or multiple wooden boards glued together at the narrow sides thereof.

3) Chipboard:

A panel produced by pressing together a three-ply layer of glued woodchips with a pressing force of up to about 30 bar between heatable pressing surfaces at a temperature from about 130 to 250° C., with 3.1) a lower cover layer 1 and an upper cover layer 2, each of which may be smooth or may have an outer surface 1a, 2a that has been matted by fine sanding, and a rough inner surface 1b, 2b, may consist of densely packed, permanently bonded wood chips, and as a rule may have a thickness of about 2 to 5 mm, and with 3.2) a core layer 3 of coarser wood chips in comparison to cover layers 1, 2, which chips are less densely packed and not so firmly bonded to each other as those of cover layers 1, 2, has a lower density and is considerably, as a rule several times thicker than a cover layer 1, 2

4) Lightweight Sandwich Panel (acronym: LSP):

Panel with 4.1) a lower and an upper cover layer 1, 2, which corresponds to that of a chipboard or fibreboard, and 4.2) an intermediate layer 3 arranged between cover layers 1, 2, which comprises a synthetic resin rigid foam in which optionally a reinforcement of chips and/or fibres is embedded, and which has a density of about 20 to 80 g/dm³ and a thickness that is considerably, as a rule multiple times greater than that of a cover layer 1, 2.

5) Ply:

A loose aggregate material scattered over a flat area and comprising or consisting of glued woodchips and/or fibres;

5.1) Lower Cover Ply 11 and Upper Cover Ply 22:

plies made from woodchips and/or fibres covered with a thin film of an adhesive, which may be compressed between heatable pressing surfaces with a pressing force of up to about 30 bar and a temperature of about 130 to 250° C., to form plies of densely packed, permanently bonded wood chips and/or fibres, each typically about 2 to 5 mm thick, 5.2) Intermediate Ply 33:

ply arranged between the inner surfaces and the bottom and top cover plies 11, 22 and made from incompletely glued, preferably relatively coarse wood chips and/or fibres that, by compressing of cover plies 11, 22, form a core layer 3 having a lower density from more weakly bonded wood chips and/or fibres and having a thickness significantly, typically several times, greater than that of a cover layer 1, 2 consisting produced from one of the cover plies 11, 22.

Although they were unsuitable for industrial mass production of a number of reasons, until the beginning of the 20th century solid wood panels were the only wood-based panels available, even though industrialization had already begun decades earlier.

After the First World War, solid wood panels for industrial products were replaced first by plywood panels and later by chipboard, and today these still make up the lion's share of the composite wood panel material processed in the furniture and construction industries, although they too have some disadvantages. For example, they require a great deal of resources to produce (wood, glue and energy) and then result in the creation of a very heavy panel (600 to 750 g/dm³). LSPs have a substantially lower density, but so far, because of the high costs of manufacturing them, they have only acquired any practical significance in specialised fields such as boat and aircraft building, as well as for wind turbines, where their lightweight construction properties outweigh price considerations.

Therefore numerous attempts have been made to develop cost-effective, resource-economical processes for preparing LSPs, but none have achieved real success because the production costs were too high and/or the properties thereof were inadequate for the industrial applications.

The closest prior art is a method described in patent application WO 2008/071618 A2. Here, a continuous process for producing lightweight sandwich panels is described in which, in a first step, a covering layer of wood chips is created by compression and heating, which layer is then divided into two cover layers by means of a separating device, so that a foamable intermediate layer material may then be introduced, which is then foamed to produce the finished sandwich panel.

A method is also described in patent application US 2010/0 133 713 A1, in which first a cover panel is produced, and is then split horizontally by a "steam sword", enabling the foaming intermediate layer to be introduced.

This application differs from the above in the manner in which the cover layers are separated. According to WO 2008/071618 A2 and US 2010/0 133 713 A1, the separation is carried out using a corresponding device, whereas according to this application the separation is carried out by selecting suitable process conditions.

In patent application EP 1 469 140 B1 also, the separation of a covering layer by means of a splitting device, a wedge, is described.

In patent application WO 2010/133610 A1, as a supplement to patent application WO 2008/071618 A2, a Novolac system is suggested for the intermediate foam layer.

In patent application JP S57-185 136 A, the use of PU systems for producing wood chip boards is described, wherein water is added to cause the PU system to foam.

The use of PU systems for sandwich panels with wood chip cover plies is known from patent application DE 12 28 403 A.

Reference is also made to JP-A-2002 338373, DE-A-23 57817, DE-A-10 2004 053 871, DE-A-42 26 988 and DE 202 15 919 U1.

The object of the invention is therefore to suggest a cost-effective, continuous, high-quality method for producing LSP.

This object is achieved according to the invention with a method having the features described in claim 1. Advantageous variations of the invention are described in the subordinate claims.

In a first preferred embodiment of the method according to the invention, a conventional chipboard having only two cover layers and no intermediate layer is first produced from glued wood chips in a conventional process in a double-band press. In order to be able to introduce the intermediate layer afterwards, the cover layers must be separated. No tools are used for this, but rather the steam pressure generated inside the chipboard during the compression and heating is not reduced by cooling before leaving the press, but is instead used to pull the cover layers apart.

When manufacturing conventional chipboard, the steam pressure in the panel is one of the limits of the production speed. The steam pressure in the chipboard must not be too high when the panel leaves the press, as the panel would be split along the middle partly or completely and would thus become unusable. Therefore, checks are carried out constantly to detect centre cracks, so that the process can be constantly adjusted.

This hitherto undesirable effect constitutes one of the basic principles of the present invention that enables an intermediate layer to be introduced subsequently and at the same time frees the production process from a range of restrictions, which are now no longer significant. The core temperature in the chipboard may be higher than before, which speeds up the setting process of the glue. A starting material may contain more water, since excess water can escape on the inner surfaces of the cover layers and be discharged laterally as steam after the cover layers are separated, thereby reducing the costs of drying and facilitating thermal conduction in the process. Since the cover layers do not have to cool down before leaving the press, the press can be made significantly shorter.

After the cover layers are split apart, they are separated to enable the introduction of a polyurethane foam system as the intermediate layer, and the polymerisation process thereof is accelerated considerably by the moisture present and the heat still contained in the cover layers. After the polyurethane foam has started to foam, the cover layers are brought together again to form a panel, now with the polyurethane foam layer positioned between them. When it foams, the polyurethane foam will fill all the depressions in the rough inner sides of the cover layers, thus forming a transition layer between the cover layer and the intermediate layer. The polyurethane foam will itself form a permanent bond with the cover layers without any additional adhesive. The panel, in which all the layers are now bonded to each other, is then transported on so that its thickness can be calibrated, and to allow the intermediate layer to cure in a further double-belt press or mould until it is dimensionally stable enough for cooling and stacking.

The cover layers may consist of wood chips (chipboard or OSB), wood fibres (MDF or HDF panel) or other renewable organic materials (such as bark, grasses, straw).

The glue systems used most often in the composite wood products industry today are urea resins. However, all other glues that are in common use today may also be used in the method according to the invention. However, a gluing system that sets at temperatures above 100° C. is preferred, because the steam pressure causes the separation of the cover layers and accelerates the foaming reaction of the intermediate layer.

In order for the polyurethane foam to foam as an intermediate layer, a propellant is required. In this context, volatile propellants such as pentane may be used. For reasons of operating safety and environmental friendliness, however, a water-driven polyurethane system in which carbon dioxide is formed by the reaction between water and isocyanate and functions as the propellant is suitable; in this way, no hydrocarbons are released by evaporation to present a possible risk of explosion and/or pollute the environment.

If panels are to be produced with a particularly heavy adhesive coat, or if an adhesive that sets below 100° C. is to be used, it may be that the steam pressure is not sufficient to tear the panel apart. In such a case, it may be necessary to separate the layers by interposing a separating ply between said cover layers before they are compressed. Such a separating ply may be for example: unglued wood chips that become permanently embedded in the intermediate layer or in the transition zones between the cover layers and the intermediate layer.

Other separating plies are also conceivable, which may be integrated at the same time in the intermediate layer or in the transition zones, or may be removed again after the cover layers have been compressed and separated, before the intermediate layer is inserted. For applications in which the cover layers are exposed to widely differing loads, it is practical to produce LSPs that have cover layers of different thicknesses. This can be achieved by using top and bottom pressing surfaces at different temperatures, so that the coldest zone in the chipboard during compression is not in the middle, but higher or lower. Consequently, the panel will not separate centrally, but asymmetrically. This effect may also be achieved by scattering a separating layer asymmetrically.

The hard polyurethane foam intermediate layer bonds permanently with the cover layers by foaming in situ, unassisted, without any additional adhesive. The hard polyurethane foam intermediate layer may also permanently incorporate substances that are inserted in the intermediate layer prior to foaming. In this context, substances such as glass fibres, carbon fibres or wood fibres to increase stability, silicon oxide or lead sulphate to absorb sound or radiation, foam beads made from plastics, such as polystyrene or even other polyurethane foams, as well as organic foams made from corn or wheat starch are conceivable, and may serve to lower the costs for the intermediate layer as inexpensive filler materials without seriously degrading the properties.

All good glues that can also be used to produce conventional chipboard panels are suitable for bonding the cover layers; formaldehyde-urea resins or isocyanates are used frequently at present.

The panels that are producible according to the method described in the preceding are characterized by cover layers that correspond to today's chipboard, and a hard polyurethane foam intermediate layer positioned therebetween, which, since it was foamed in situ, forms a transition zone with the rough inner sides of the outer covers by filling all the unevennesses on the insides of the cover layers with a hard polyurethane foam layer. The stability of the transition zone is then at least equal to that of the intermediate layer. The hard polyurethane foam intermediate layer has a density from 20 to 80 g/dm$^3$ depending on the desired stability of the panel. With a foam weight of less than 20 g/dm$^3$, the intermediate layer becomes unstable and the LSP becomes unusable, and with a foam weight greater than 80 g/dm$^3$ the chipboard cover layers are no longer sufficient for the quality of the intermediate layer, and the LSP becomes substantially more expensive than conventional chipboard. If the cover layer weighs from 600 to 750 $g/dm^3$ the weight of the LSP is in the range from 100 to 400 $g/dm^3$.

Of course, the densities of the intermediate layer and of the entire LSP may be changed significantly by incorporating other substances in the intermediate layer.

The method described makes use of all those devices that are also used to produce a conventional chipboard panel, although a device (9) is arranged after the press and before the crosscut saw, which device comprises elements (9a), (9b) for moving the cover layers (1) and (2) apart after they have been separated by steam pressure, and spraying means (9c) and (9d) for spraying a liquid polyurethane system, and an apparatus (8) with parallel pressing surfaces for foaming, curing and calibrating an intermediate layer (3) comprising a foamable polyurethane system.

The panels that are producible according to the method described previously are characterized by cover layers that correspond to today's chipboard, and by an intermediate hard polyurethane foam layer positioned therebetween which, since it was foamed in situ, forms a transition zone with the rough inner sides of the outer covers by filling all the unevennesses on the insides of the cover layers with a hard polyurethane foam layer. The stability of the transition zone is then at least equal to that of the intermediate layer. The hard polyurethane foam intermediate layer has a density from 20 to 80 $g/dm^3$ depending on the desired stability of the panel. With a foam weight of less than 20 $g/dm^3$, the intermediate layer becomes unstable and the LSP becomes unusable, and with a foam weight greater than 80 $g/dm^3$ the chipboard cover layers are no longer sufficient for the quality of the intermediate layer, moreover the LSP becomes substantially more expensive than conventional chipboard. If the cover layer weighs from 600 to 750 $g/dm^3$ the weight of the LSP is in the range from 100 to 400 $g/dm^3$.

Of course, the densities of the intermediate layer and of the entire LSP may be changed significantly by incorporating other substances in the intermediate layer.

The invention claimed is:

1. A continuous method for producing a lightweight sandwich panel having a reference thickness, comprising:
   a lower cover layer,
   and
   an upper cover layer,
   both of which consist of densely packed, permanently bonded wood chips, and have a smooth outer surface respectively, and a rough, steam-permeable inner surface respectively,
   and
   an intermediate layer comprising a synthetic resin foam which is disposed between the lower and upper cover layers and bonded permanently thereto,
   the method comprising at least the following steps:
   1) providing a layered ply having at least one scattered lower cover ply and an upper cover ply scattered above it, both made from glued wood chips,
   2) compressing said layered ply between heated pressing surfaces with a pressure of up to about 30 bar and at a temperature of the pressing surfaces in the range from 130 to 250° C. to form a chipboard,
   3) moving the pressing surfaces apart, and thereby releasing the pressure on the chipboard panel, thus causing the panel to split in the middle due to steam pressure built up in its core zone, and to divide into two equally wide cover layers, each having a smooth exterior and a rough interior surface,
   4) guiding the cover layers apart, so that a polyurethane foam can be introduced therebetween,
   5) spraying or otherwise inserting a foamable, curable hard polyurethane system containing at least the following components:
      isocyanate and/or polyisocyanate(s),
      at least one polyol, and
      one or more volatile propellant(s) and/or water, wherein the water, if present, reacts with another component to form carbon dioxide,
      on the inner surface(s) of the lower cover layer or of both cover layers,
   6) foaming and compacting the polyurethane system to form a viscous to plastically deformable, but still compressible, polyurethane foam layer,
   7) guiding the upper and/or lower cover layer back such that their distance is (i) equal to the reference thickness if both cover layers of the lightweight sandwich panel have a smooth outer surface, or (ii) about 0.1 to 0.3 mm larger than the reference thickness if one or both cover layers of the lightweight sandwich panel has/have a matted outer surface due to fine sanding,
   8) stabilising the lightweight sandwich panel calibrated according to 7) by passing it between pressing surfaces operating parallel to each other and at the distance defined in 7), until the polyurethane system has reacted fully to yield hard polyurethane foam,
   9) cutting to length and trimming the edges of the lightweight sandwich panel in the form of a continuous strip to obtain panels with standard commercial dimensions, and
   10) optionally matting the outer surface(s) of one or both cover layers by fine sanding to the reference thickness,
   wherein
   a) an intermediate layer is not scattered between the cover plies in step 1),
   b) the temperature of the pressing surfaces and the duration of the pressing process are selected such that a high steam pressure builds up in the region of inner surfaces of cover layers which pressure splits the woodchip panel produced in step 2) apart centrally through the release of pressure caused by divergent movement of the pressing surfaces in step 3) and divides said panel into two equally thick cover layers of densely packed, permanently bonded wood chips having smooth outer surfaces and rough inner surfaces,
   c) the cover layers are guided apart on leaving the press by means of rollers and/or conveyor belts so that the distance between their inner surfaces becomes large enough to allow a spraying or insertion apparatus for spraying or otherwise inserting the polyurethane system between the cover layers according to step 5, and
   d) the heat that was introduced into the cover layers during compression thereof is used to accelerate the reaction process of the polyurethane system.

2. The method according to claim 1, wherein the polyurethane system contains water.

3. The method according to claim 1, wherein substances are introduced into the polyurethane foam layer that alter the properties of the lightweight sandwich panel with respect to stability, absorption of sound or radiation or by virtue of their low costs reduce the manufacturing costs of the polyurethane foam layer and thus also of the lightweight sandwich panel.

4. The method according to claim 1, wherein
a thermosetting urea-formaldehyde resin or a polyurethane system is used as the glue for gluing the wood chips for the cover plies.

5. The method according to claim 1, wherein
1) the mutually facing inner surfaces of the cover layers have a rough profile, the unevennesses of which are filled with the hard polyurethane foam from which the intermediate layer is made, and thus form 0.5 to 2 mm thick transition zones,
2) the density of the intermediate layer (3) is between 20 and 100 g/dm$^3$ and that of the lightweight sandwich panel is between 100 and 400 g/dm$^3$, and
3) the intermediate layer is a hard polyurethane foam system created by foaming and curing a polyurethane system in situ between the cover layers.

6. The method according to claim 5, wherein
other substances in the form of fibres, powders, fine or coarse grains, flakes or foam particles that alter the properties of the lightweight sandwich panel with respect to stability, absorption of sound or radiation or by virtue of their low costs reduce the manufacturing costs of the intermediate layer and thus also of the lightweight sandwich panel are incorporated in the hard polyurethane foam layer.

7. A continuous method for producing a lightweight sandwich panel having a reference thickness, comprising:
a lower cover layer,
and
an upper cover layer,
both of which consist of densely packed, permanently bonded wood chips, and have a smooth outer surface respectively, and a rough, steam-permeable inner surface respectively,
and
an intermediate layer comprising a synthetic resin foam which is disposed between the lower and upper cover layers-and bonded permanently thereto,
the method comprising at least the following steps:
1) providing a layered ply having at least one scattered lower cover ply and an upper cover ply scattered above it, both made from glued wood chips,
2) compressing said layered ply between heated pressing surfaces with a pressure of up to about 30 bar and at a temperature of the pressing surfaces in the range from 130 to 250° C. to form a chipboard,
3) moving the pressing surfaces apart, and thereby releasing the pressure on the chipboard panel, thus causing the panel to split in the middle due to steam pressure built up in its core zone, and to divide into two equally wide cover layers, each having a smooth exterior and a rough interior surface,
4) guiding the cover layers apart, so that a polyurethane foam can be introduced therebetween,
5) spraying a foamable, curable hard polyurethane system containing at least the following components:
isocyanate and/or polyisocyanate(s),
at least one polyol, and
one or more volatile propellant(s) and/or water, wherein the water, if present, reacts with another component to form carbon dioxide,
on the inner surface(s) of the lower cover layer or of both cover layers,
6) foaming and compacting the polyurethane system to form a viscous to plastically deformable, but still compressible, polyurethane foam layer,
7) guiding the upper and/or lower cover layer back such that their distance is (i) equal to the reference thickness if both cover layers of the lightweight sandwich panel have a smooth outer surface, or (ii) about 0.1 to 0.3 mm larger than the reference thickness if one or both cover layers of the lightweight sandwich panel has/have a matted outer surface due to fine sanding,
8) stabilising the lightweight sandwich panel calibrated according to 7) by passing it between pressing surfaces operating parallel to each other and at the distance defined in 7), until the polyurethane system has reacted fully to yield hard polyurethane foam,
9) cutting to length and trimming the edges of the lightweight sandwich panel in the form of a continuous strip to obtain panels with standard commercial dimensions, and
10) optionally matting the outer surface(s) of one or both cover layers by fine sanding to the reference thickness, wherein
a) in step 1), an intermediate ply consisting of relatively large, weakly glued or unglued wood chips or material other than wood chips is scattered between the cover plies in order to assist the splitting of the chipboard in step 3, which intermediate ply is blown out later between steps 3 and 4 or is permanently incorporated by the polyurethane foam layer in step 6,
b) the temperature of the pressing surfaces and the duration of the pressing process are selected such that a high steam pressure builds up in the region of inner surfaces of cover layers, which pressure splits the woodchip panel produced in step 2) apart centrally through the release of pressure caused by divergent movement of the pressing surfaces in step 3) and divides said panel into two equally thick cover layers of densely packed, permanently bonded wood chips having smooth outer surfaces and rough inner surfaces,
c) the cover layers are guided apart on leaving the press by means of rollers and/or conveyor belts so that the distance between their inner surfaces becomes large enough to allow a spraying or insertion apparatus for spraying the polyurethane system between the cover layers (1), (2) according to step 5, and
d) the heat that was introduced into the cover layers during compression thereof is used to accelerate the reaction process of the polyurethane system.

8. The method according to claim 7, wherein
in step 1 an intermediate ply consisting of relatively large, weakly glued or unglued wood chips is scattered between the cover plies in order to assist the splitting of the chipboard in step 3, which intermediate ply is blown out later between steps 3 and 4 or is permanently incorporated by the polyurethane foam layer in step 6.

9. The method according to claim 7, wherein a material other than wood chips is inserted as an intermediate ply between the cover plies in order to assist the splitting of the chipboard in step 3, which intermediate ply is either incorporated in the polyurethane foam layer in step 6 or removed between steps 3 and 4.

10. A continuous method for producing a lightweight sandwich panel having a reference thickness, comprising:
a lower cover layer,
and
an upper cover layer,
both of which consist of densely packed, permanently bonded wood chips, and have a smooth outer surface respectively, and a rough, steam-permeable inner surface respectively, and
an intermediate layer comprising a synthetic resin foam which is disposed between the lower and upper cover layers-and bonded permanently thereto,
the method comprising at least the following steps:
1) providing a layered ply having at least one scattered lower cover ply and an upper cover ply scattered above it, both made from glued wood chips,
2) compressing said layered ply between heated pressing surfaces with a pressure of up to about 30 bar and at a temperature of the pressing surfaces in the range from 130 to 250° C. to form a chipboard,
3) moving the pressing surfaces apart, and thereby releasing the pressure on the chipboard panel, thus causing the panel to split in the middle due to steam pressure built up in its core zone, and to divide into two equally wide cover layers, each having a smooth exterior and a rough interior surface,
4) guiding the cover layers apart, so that a polyurethane foam can be introduced therebetween,
5) spraying a foamable, curable hard polyurethane system containing at least the following components:
isocyanate and/or polyisocyanate(s),
at least one polyol, and
one or more volatile propellant(s) and/or water, wherein the water, if present, reacts with another component to form carbon dioxide,
on the inner surface(s) of the lower cover layer or of both cover layers,
6) foaming and compacting the polyurethane system to form a viscous to plastically deformable, but still compressible, polyurethane foam layer,
7) guiding the upper and/or lower cover layer back such that their distance is (i) equal to the reference thickness if both cover layers of the lightweight sandwich panel have a smooth outer surface, or (ii) about 0.1 to 0.3 mm larger than the reference thickness if one or both cover layers of the lightweight sandwich panel has/have a matted outer surface due to fine sanding,
8) stabilising the lightweight sandwich panel calibrated according to 7) by passing it between pressing surfaces operating parallel to each other and at the distance defined in 7), until the polyurethane system has reacted fully to yield hard polyurethane foam,
9) cutting to length and trimming the edges of the lightweight sandwich panel in the form of a continuous strip to obtain panels with standard commercial dimensions, and
10) optionally matting the outer surface(s) of one or both cover layers by fine sanding to the reference thickness,
wherein
a) in step 1), an intermediate ply is not scattered between the cover plies,
b) the temperature of the pressing surfaces and the duration of the pressing process are selected such that a high steam pressure builds up in the region of inner surfaces of cover layers, which pressure splits the woodchip panel produced in step 2) apart centrally through the release of pressure caused by divergent movement of the pressing surfaces in step 3), and divides said panel into two cover layers of densely packed, permanently bonded wood chips having smooth outer surfaces and rough inner surfaces,
c) the cover layers are guided apart on leaving the press by means of rollers and/or conveyor belts so that the distance between their inner surfaces becomes large enough to allow a spraying or insertion apparatus for spraying the polyurethane system between the cover layers according to step 5, and
d) the heat that was introduced into the cover layers during compression thereof is used to accelerate the reaction process of the polyurethane system.

11. The method according to claim 10, wherein the heated pressing surfaces in step 2 comprise upper and lower heating surfaces at different temperatures and the cover layers are of different thicknesses but each is of uniform thickness in itself.

12. A continuous method for producing a lightweight sandwich panel having a reference thickness, comprising:
a lower cover layer,
and
an upper cover layer,
both of which consist of densely packed, permanently bonded wood chips, and have a smooth outer surface respectively, and a rough, steam-permeable inner surface respectively,
and
an intermediate layer comprising a synthetic resin foam which is disposed between the lower and upper cover layers-and bonded permanently thereto,
the method comprising at least the following steps:
1) providing a layered ply having at least one scattered lower cover ply and an upper cover ply scattered above it, both made from glued wood chips,
2) compressing said layered ply between heated pressing surfaces with a pressure of up to about 30 bar and at a temperature of the pressing surfaces in the range from 130 to 250° C. to form a chipboard,
3) moving the pressing surfaces apart, and thereby releasing the pressure on the chipboard panel, thus causing the panel to split in the middle due to steam pressure built up in its core zone, and to divide into two equally wide cover layers, each having a smooth exterior and a rough interior surface,
4) guiding the cover layers apart, so that a polyurethane foam can be introduced therebetween,
5) spraying a foamable, curable hard polyurethane system containing at least the following components:
isocyanate and/or polyisocyanate(s),
at least one polyol, and
one or more volatile propellant(s) and/or water, wherein the water, if present, reacts with another component to form carbon dioxide,
on the inner surface(s) of the lower cover layer or of both cover layers,
6) foaming and compacting the polyurethane system to form a viscous to plastically deformable, but still compressible, polyurethane foam layer,
7) guiding the upper and/or lower cover layer back such that their distance is (i) equal to the reference thickness if both cover layers of the lightweight sandwich panel have a smooth outer surface, or (ii) about 0.1 to 0.3 mm larger than the reference thickness if one or both cover layers of the lightweight sandwich panel has/have a matted outer surface due to fine sanding,
8) stabilising the lightweight sandwich panel calibrated according to 7) by passing it between pressing surfaces operating parallel to each other and at the distance defined in 7), until the polyurethane system has reacted fully to yield hard polyurethane foam,
9) cutting to length and trimming the edges of the lightweight sandwich panel in the form of a continuous strip to obtain panels with standard commercial dimensions, and 10) optionally matting the outer surface(s) of one or both cover layers by fine sanding to the reference thickness, wherein a) in step 1), an intermediate ply consisting of relatively large, weakly glued or unglued wood chips or material other than wood chips is scattered between the cover plies in order to assist the splitting of the chipboard in step 3, which intermediate ply is blown out later between steps 3 and 4 or is permanently incorporated by the polyurethane foam layer in step 6, b) the temperature of the pressing surfaces and the duration of the pressing process are selected such that a high steam pressure builds up in the region of inner surfaces of cover layers, which pressure splits the woodchip panel produced in step 2) apart centrally through the release of pressure caused by divergent movement of the pressing surfaces in step 3) and divides said panel into two cover layers of densely packed, permanently bonded wood chips having smooth outer surfaces and rough inner surfaces, c) the cover layers are guided apart on leaving the press by means of rollers and/or conveyor belts so that the distance between their inner surfaces becomes large enough to allow a spraying or insertion apparatus for spraying the polyurethane system between the cover layers according to step 5, and d) the heat that was introduced into the cover layers during compression thereof is used to accelerate the reaction process of the polyurethane system.

13. The method according to claim 12, wherein, in step 1, the intermediate ply is asymmetrically introduced between the cover plies and the cover layers are of different thicknesses but each is of uniform thickness in itself.

* * * * *

UNITED STATES PATENT AND TRADEMARK OFFICE
CERTIFICATE OF CORRECTION

| | | |
|---|---|---|
| PATENT NO. | : 9,522,480 B2 | Page 1 of 1 |
| APPLICATION NO. | : 14/435597 | |
| DATED | : December 20, 2016 | |
| INVENTOR(S) | : Gerald Neubauer et al. | |

It is certified that error appears in the above-identified patent and that said Letters Patent is hereby corrected as shown below:

In the Claims

Claim 7, Column 8, Line 42, delete "(1), (2)" after layers.

Signed and Sealed this
Ninth Day of May, 2017

Michelle K. Lee
*Director of the United States Patent and Trademark Office*